United States Patent
Davignon et al.

(10) Patent No.: US 7,474,928 B2
(45) Date of Patent: Jan. 6, 2009

(54) HYBRID VECTOR/RASTER BASED PAINT

(75) Inventors: Marc-Andre Davignon, Montreal (CA); Marrin Helie, Laval (CA)

(73) Assignee: Autodesk Canada Co., Montreal, Quebec (CA)

( * ) Notice: Subject to any disclaimer, the term of this patent is extended or adjusted under 35 U.S.C. 154(b) by 449 days.

(21) Appl. No.: 11/264,876

(22) Filed: Nov. 2, 2005

(65) Prior Publication Data

US 2006/0232597 A1 Oct. 19, 2006

Related U.S. Application Data

(63) Continuation-in-part of application No. 11/107,434, filed on Apr. 15, 2005.

(51) Int. Cl.
*G05B 15/00* (2006.01)
*G09G 5/00* (2006.01)
(52) U.S. Cl. .............................. 700/83; 345/581
(58) Field of Classification Search ............ 700/83; 715/780, 760, 748, 742, 741, 743, 744, 513; 345/629, 581
See application file for complete search history.

(56) References Cited

U.S. PATENT DOCUMENTS

| | | | | |
|---|---|---|---|---|
| 5,307,452 A | * | 4/1994 | Hahn et al. | 345/592 |
| 5,434,959 A | * | 7/1995 | Von Ehr et al. | 345/441 |
| 6,389,162 B2 | * | 5/2002 | Maeda | 382/172 |
| 6,396,947 B1 | * | 5/2002 | Doll | 382/162 |
| 6,628,295 B2 | * | 9/2003 | Wilensky | 345/594 |
| 6,633,300 B1 | * | 10/2003 | Tomack et al. | 345/581 |
| 6,870,545 B1 | * | 3/2005 | Smith et al. | 345/619 |
| 7,123,269 B1 | * | 10/2006 | Bourdey et al. | 345/589 |
| 7,126,609 B1 | * | 10/2006 | Asente et al. | 345/581 |
| 7,312,895 B2 | * | 12/2007 | Ooyama | 358/1.9 |
| 7,385,612 B1 | * | 6/2008 | Peterson | 345/619 |
| 2004/0062522 A1 | * | 4/2004 | Kitora et al. | 386/46 |
| 2005/0068331 A1 | * | 3/2005 | Sekiguchi et al. | 345/589 |
| 2005/0111052 A1 | * | 5/2005 | Nishikawa et al. | 358/448 |
| 2005/0111745 A1 | * | 5/2005 | Kato et al. | 382/243 |

FOREIGN PATENT DOCUMENTS

JP 11224331 A * 8/1999

* cited by examiner

*Primary Examiner*—Ronald D Hartman, Jr.
(74) *Attorney, Agent, or Firm*—Gates & Cooper LLP

(57) ABSTRACT

A method, system, apparatus, and article of manufacture provide the ability to conduct a hybrid raster/vector based paint operation. A user commences a raster based paint operation. Based on the raster operation, vector-based information is determined and recorded. The system then determines if a requested user operation requires the vector-based information. If the requested user operation requires the vector-based information, a representative raster based stroke is generated/recreated based on the vector-based information and the requested user operation is performed on the representative raster based stroke.

36 Claims, 5 Drawing Sheets a) Brush/Pressure box    b) Pressure curve    c) Profile box

HYBRID VECTOR/RASTER BASED PAINT

CROSS-REFERENCE TO RELATED APPLICATIONS

This application is a continuation-in-part of the following co-pending and commonly assigned patent application, which application is incorporated by reference herein:

U.S. patent application Ser. No. 11/107,434, entitled "LAYER BASED PAINT OPERATIONS", by Marc-Andre Davignon and Martin Helie, filed on Apr. 15, 2005.

BACKGROUND OF THE INVENTION

1. Field of the Invention

The present invention relates generally to image/video display and processing systems, and in particular, to a method, apparatus, and article of manufacture for conducting a hybrid vector/raster based paint operation that provides the ability to perform undo operations.

2. Description of the Related Art

In audio/video applications, a paint application enables the user to perform a wide range of painting tasks from simple retouching, to motion tracking, to full cartoon animation. For example, a user may paint (e.g., a brush stroke) onto a single particular frame. Prior art applications provide two different types of paint operations—vector and raster. In vector based paint operations, strokes are recorded in a vector for later use and manipulation. In raster based paint operations, the stroke is recorded as a bitmap or series of pixels that comprise the paint stroke. Vector-based paint operations are limited in that the method of drawing the stroke is not natural—a user must select a tool/type of paint stroke and utilize the tool in an unnatural manner. Further, as the number of vector-based paint operations/strokes increases, the ability to interact with the resulting image decreases. Raster based paint operations are limited in that the use of bitmaps consume considerable memory and processing such that unlimited undo operations are not feasible. In addition, prior art based paint operations cannot be performed on a clip containing multiple frames but are limited to a single static frame. These problems may be better understood with a description of prior art paint operations.

Within a paint application, an object consists of anything that may be drawn with a paint drawing operator. Objects may be divided into three main groups: paint, selection, and mask. Paint objects create or modify pixels. Selection objects define a specific area of the screen within which other paint objects or effects operate. Mask objects make areas of a layer transparent. Thus, after, an object is created, the object may be selected and its properties (e.g., size, shape, color, opacity, etc.) may be changed. Examples of objects that may be created in a paint application include: brush strokes, rectangles, ellipses, and polygons; text; lasso selections; magic wand selections; rectangular, elliptical, and polygon selections; text selections, fill; freehand masks; and rectangular, elliptical, and polygon masks. However, all of the above paint objects, whether vector or raster based have various limitations.

A vector based paint object is an image or stroke that is described by basic geometric shapes such as rectangles, polygons, circles, ellipses, lines, and curves. Accordingly, rather than recording all of the points/pixels that make up a rectangle or polygon, the vector image may be described using equations such as: the origin and radius for a circle; the origin, or the four vertices of a rectangle or square; the endpoints of a line, etc. Since a minimum amount of information is stored for a vector operation, undo operations may be easily supported. However, to draw a vector image/stroke, the user must first select the appropriate tool such as a circle tool, rectangle tool, Bezier curve tool, etc. Thereafter, the user would use the tool to specify the various points of the vector image. Such a use is not a natural way to draw or conduct a paint operation. In addition, because of the loss of "natural" painting capabilities, the quality of the resulting image may decrease.

A raster based paint object is an image wherein each pixel of the image is recorded/defined as part of the image. Additionally, when painting a raster-based stroke, the pixels of the original image may be modified based on the stroke thereby erasing/overwriting any prior raster image. Thus, a raster paint object changes the values of a buffer and the source. Further, to provide support for an undo operation, the entire raster image must be captured and stored in memory (e.g., random access memory) before/after each stroke is performed. In modern image processing systems, images are extremely large. Accordingly, recording multiple raster based images to provide the ability to perform an undo operation requires a considerable amount of memory and processing capabilities. Thus, the size and processing power needed to support an undo in a raster based paint operation may be impractical.

A paint application may be used in conjunction with a composite to paint on one layer or over several layers at a time. For instance, a paint application may be used to change a subject's eye color, remove wires, fix video drop-out on a selected layer, or create text effects and cartoon animations that are added over all of the layers in a composite. In addition, prior art paint applications include both vector paint applications (that define strokes as objects) and raster paint applications (that modify pixels in the image directly or write pixels directly in separate layers that may be combined in a source image thereby modifying the source image).

Paint operators are like any other operator in that they may be viewed schematically on a per-layer basis. FIG. 1 illustrates a process tree in a schematic view. A schematic view 100 uses nodes 102-114 to represent all of the operators in a workspace performed on a particular layer, and lines (edges) 116 between nodes 102-114 to indicate the flow of image data between the operators. The output of one node 102-114 is the source for the next node 102-114. As composites 112 or other branches (e.g., paint or color correction projects) are created, a process tree indicating the flow of data through the nodes 102-114 is built automatically. As illustrated in FIG. 1, source data consists of gator node 102 and snake node 104. A paint operation (e.g., via paint node 106) is performed on gator node 102 (e.g., by drawing the sun). The connection nodes 108-110 are then used as input to the composite operator node 112, that performs a compositing operation. The compositing operation node 112 produces a result/output 114.

In addition, prior art paint modules in procedural renderers (i.e., conducted in a schematic view) are raster paint nodes that do not have layers and modify their input buffers directly. In this regard, an input buffer in a procedural renderer may come from a fairly complex process tree and modifications to that tree will re-create the input buffer. A side effect of these modifications is that the paint strokes, being applied directly to the input buffer, are lost when that input gets modified through a change in the nodes upstream of a paint node.

As used herein, an operator (e.g., paint operator 106) is the most common node. A connection node 108 and 110 represents an input for an operator. In the case of a composite operator 112, the visible connection nodes 108 and 110 are layers. The output node 114 is a node representing the render queue settings for an operator. Lastly, several nodes may be grouped into a group node.

The process tree (such as the process tree illustrated in FIG. 1) can be used to manage operators and nodes. For example, users may add operators (e.g., a paint operation) to a branch, change the process order of operators 106, and navigate easily between operator controls. Further, if an operator is added to a layer in a schematic view 100, the operator will appear as a node (e.g., the paint node 106). The same operator node may also appear in other workspace environments (e.g., a workspace panel). Further, in the schematic view, particular operators may be turned on/off as desired simply by clicking on the icon for that operator (e.g., paint 106 or composition 112).

While the above prior art schematic view and paint operations may be used to modify and edit an image/clip, the prior art has many limitations. For example, in some prior art applications, a paint operator 106 is associated with a particular version of a source image 102. Thus, if a source image (e.g., image 102) is edited, the paint operator 106 disappears and all information associated with the paint node 106 is lost. In addition, prior art paint operations cannot be performed from within the schematic view 100. Thus, in order to perform any modifications using a paint operation, the prior art requires the user to exit the schematic view, enter the paint application, perform the desired paint operation, produce a result clip, reenter the schematic view 100, import the result clip into the schematic view 100 and continue.

In addition to the above limitations, modern audio/video processing applications such as editing and compositing applications perform operations on clips consisting of multiple frames. A user may create projects for painting on changing video frames and thereby apply a paint operation across multiple frames in a clip. Accordingly, the paint object must move and follow the action in a scene. Raster based processing of multi-frame paint operations are expensive in terms of processor and memory use. Further, vector based paint operations are not flexible or natural for a user. Accordingly, what is needed is a multi-frame paint based operation that is flexible in terms of use (similar to a raster based paint operation) yet allows an unlimited amount of undo operations without consuming excessive memory and processing.

SUMMARY OF THE INVENTION

One or more embodiments of the invention provide the ability to conduct paint operations using a hybrid of both vector and raster based information. When a raster based paint operation (e.g., a paint stroke) is conducted, the paint application records vector-based information in the background (e.g., in an invisible buffer). Such vector-based information may be recorded dynamically as the stroke is conducted or subsequent to stroke completion (e.g., upon evaluating a completed stroke). The vector based information that is recorded is sufficient to enable the generation of a raster paint stroke that is similar to the original raster paint stroke. Examples of the vector based information that is determined and recorded include a path spline, a speed/rate spline, and/or a pressure spline. Such vector-based information enables multiple operations that are not possible with a pure raster based operation yet allows the user to paint a stroke in a natural manner similar to a raster paint operation.

When the user attempts to perform an action that requires the vector based information (e.g., a stroke modification or recalculation, a significant number of undo operations, a clipless setup, etc.), the paint application generates the raster based stroke (or the bitmap information) that is represented by the vector based information. In this regard, the raster based stroke is not generated and the recorded vector-based information may not be used until required/needed. Such non-use of the vector-based information conserves memory and processing.

Once the raster stroke is generated, the newly generated stroke may be used to perform the desired user operation. For example, the generated stroke can be used to perform an unlimited number of undo levels, a stroke modification, a stroke recalculation, a stroke resizing, a clipless setup, or other vector based operations. In addition, since the information is vector-based, the information (e.g., paint stroke) may be modified subsequent to the execution of later nodes (in a procedural renderer) and the modified stroke may be applied without affecting the subsequent node execution. In other words, in the prior art, with a raster based paint stroke, the stroke modifies the source and content, thereby invalidating later node execution. However, by utilizing vector based information, later nodes may not be affected and node modifications may be more easily performed.

In view of the above, the invention provides the ability for a paint operation to behave similar to a raster paint visually but provides the ability for paint strokes to survive changes in nodes upstream of the paint node and behave and support vector based operations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 2:
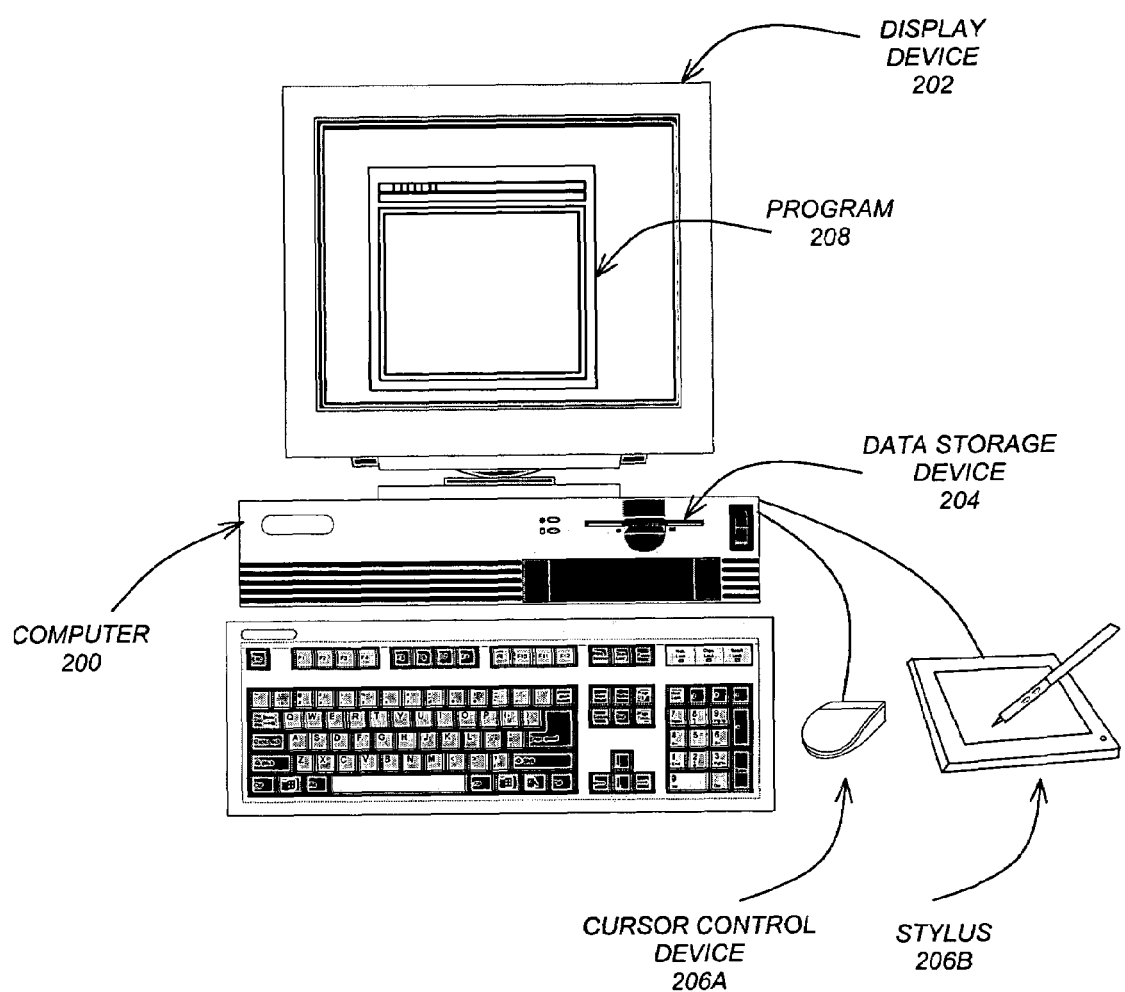
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a display device 202, data storage device(s) 204, cursor control devices 206A, stylus 206B, and other devices. Those skilled in the art will recognize that any combination of the above components, or any number of different components, peripherals, and other devices, may be used with the computer 200.

One or more embodiments of the invention are implemented by a computer-implemented program 208. Such a program may be a paint application, media player, a video editing program, an effects program, compositing application, or any type of program that executes on a computer 200. The program 208 may be represented by a window displayed on the display device 202. Generally, the program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc. In addition, program 208 (or other programs described herein) may be an object-oriented program having objects and methods as understood in the art.

Figure 3:
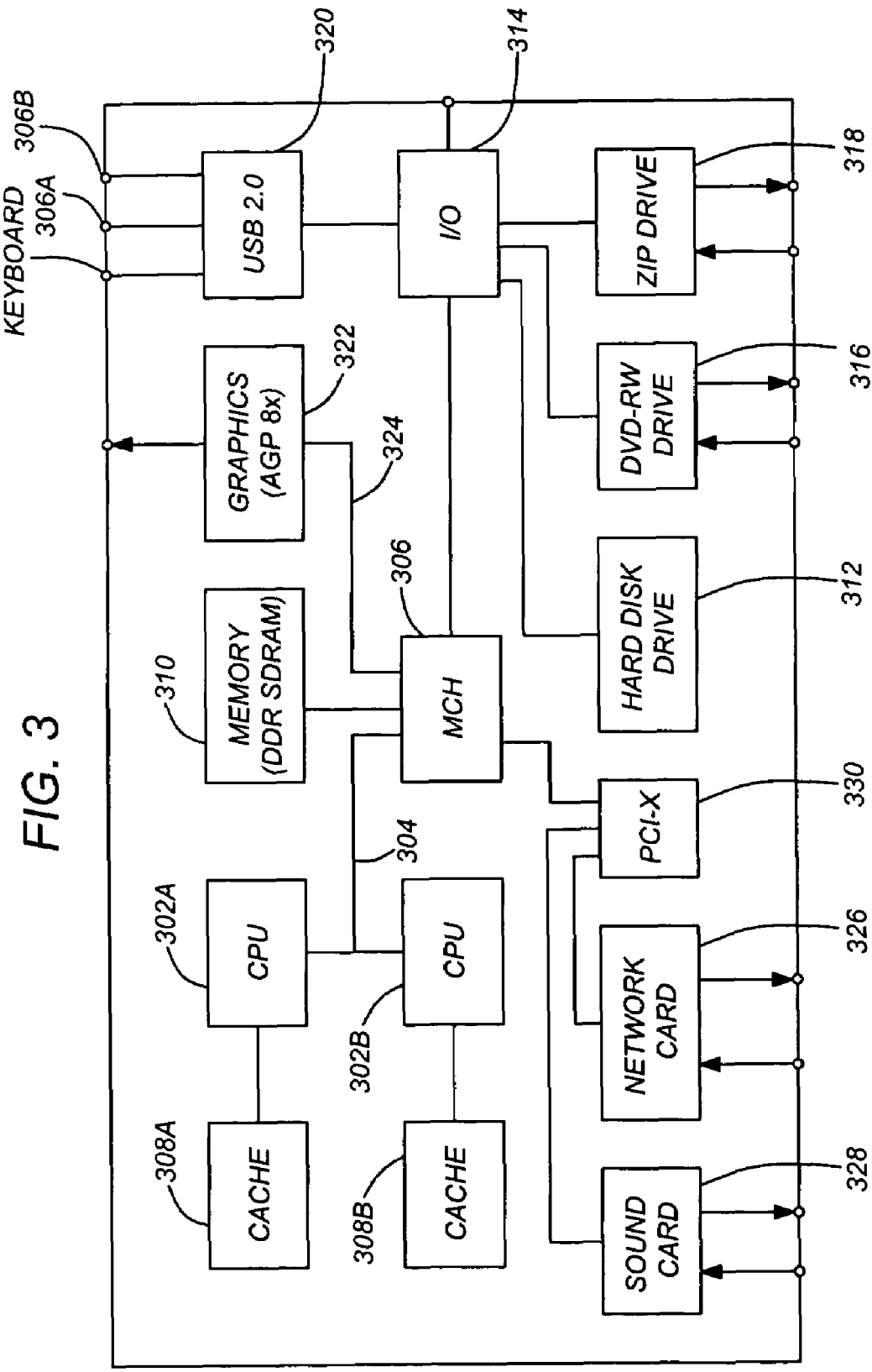
FIG. 3 illustrates the of a computer system in accordance with one or more embodiments of the invention.

The components of computer system 200 are further detailed in FIG. 3 and, in the preferred embodiment of the present invention, said components are based upon the Intel® E7505 hub-based chipset.

The system 300 includes two Intel® Pentium™ Xeon™ DP central processing units (CPU) 302A, 302B running at three Gigahertz, that fetch and execute instructions and manipulate data via a system bus 304 providing connectivity with a Memory Controller Hub (MCH) 306. CPUs 302A, 302B are configured with respective high-speed caches 308A, 308B comprising at least five hundred and twelve kilobytes, which store frequently-accessed instructions and data to reduce fetching operations from a larger memory 310 via MCH 306. The MCH 306 thus co-ordinates data flow with a larger, dual-channel double-data rate main memory 310, that is between two and four gigabytes in data storage capacity and stores executable programs which, along with data, are received via said bus 304 from a hard disk drive 312 providing non-volatile bulk storage of instructions and data via an Input/Output Controller Hub (ICH) 314. The I/O hub 314 similarly provides connectivity to DVD-ROM read-writer 316 and ZIP™ drive 318, both of which read and write data and instructions from and to removable data storage media. Finally, I/O hub 314 provides connectivity to USB 2.0 input/output sockets 320, to which the stylus and tablet 306B combination, keyboard, and mouse 306A are connected, all of which send user input data to system 300.

A graphics card 322 receives graphics data from CPUs 302A, 302B along with graphics instructions via MCH 306. The graphics card 322 may be coupled to the MCH 306 through a direct port 324, such as the direct-attached advanced graphics port 8X (AGP 8X) promulgated by the Intel® Corporation, the bandwidth of which exceeds the bandwidth of bus 304. The graphics card 322 may also include substantial dedicated graphical processing capabilities, so that the CPUs 302A, 302B are not burdened with computationally intensive tasks for which they are not optimized.

Network card 326 provides connectivity to a framestore by processing a plurality of communication protocols, for instance a communication protocol suitable to encode and send and/or receive and decode packets of data over a Gigabit-Ethernet local area network. A sound card 328 is provided which receives sound data from the CPUs 302A, 302B along with sound processing instructions, in a manner similar to graphics card 322. The sound card 328 may also include substantial dedicated digital sound processing capabilities, so that the CPUs 302A, 302B are not burdened with computationally intensive tasks for which they are not optimized. Network card 326 and sound card 328 may exchange data with CPUs 302A, 302B over system bus 304 by means of Intel®'s PCI-X controller hub 330 administered by MCH 306.

Those skilled in the art will recognize that the exemplary environment illustrated in FIGS. 2 and 3 are not intended to limit the present invention. Indeed, those skilled in the art will recognize that other alternative environments may be used without departing from the scope of the present invention.

Software Environment

As described above, a software application 208 such as a paint application may execute on computer 200. Alternatively, the software application 208 may comprise a procedural renderer that permits the viewing of the different paint operations schematically (see FIG. 1).

When working in the schematic view, users may modify the process tree and individual nodes prior to producing the output 114. When the user is ready to generate a final clip or an intermediate result, the user selects a process button (not shown). Once selected, all process trees in the schematic 100 are processed and one clip is written to the destination specified by each output node 114. The process of generating the final clip or intermediate result is referred to as rendering. Accordingly, the schematic view 100 may also be referred to as a procedural renderer.

In one or more embodiments, paint operations may be performed in both a standard paint application and from within the procedural renderer 100. When painting from within the procedural renderer 100, the Paint application may be referred to as Batch Paint (an application available from the assignee of the present invention). Batch Paint may be useful when the user desires to paint on different layers, or when the user desires to add painting as a step within a process tree. By adding a paint node 106 to a process tree from Batch Paint, the user can easily touch up a clip before processing the clip (e.g., in another module or before producing the result clip at output node 114).

To begin painting in Batch Paint, a paint node 106 may be dragged into the schematic view 100. In this regard, a menu bar or list of available operations may be displayed surrounding the schematic view 100 to allow the user to invoke various operations. Once the paint node 106 is in the schematic view 100, the user may click the paint node to display a Batch Paint menu that provides the various painting options.

In accordance with one or more embodiments, strokes may be painted on a selected layer within Batch Paint using available brush types and colors. Thus, the users of layers in Batch Paint simulate painting in the schematic view 100. In this regard, the painting is performed on the buffer for Batch Paint prior to the processing/rendering of the image. Such capabilities to perform a paint operation in a procedural renderer context is not available in the prior art.

In addition, the invention provides the illusion of modifying the source image by behaving exactly as a raster paint visually (i.e., paint strokes appear as if the input buffer is being directly modified instead of being painted on a layer), but strokes are actually stored on an invisible (to the user) layer. Accordingly, paint strokes survive changes in nodes upstream of the paint node. In this regard, no procedural rendering application with a paint node, has a layer-based raster paint node. Instead, the prior art merely provides pure raster paint operations which are destructive.

As described above, paint operations may be conducted in both Batch Paint and a standard paint based application. However, the prior art fails to provide the ability to conduct a paint operation while supporting multiple undo levels in a multi-frame capacity.

Hybrid Vector/Raster Based Paint Operation

As described above, in the prior art, vector based operations destroys quality (i.e., does not accurately reflect what the user desires to "paint"). Additionally, the use of raster based paint operations lack the ability to perform unlimited undo operations and consume considerable time, memory, and resources. Accordingly, what is needed is a vector based paint operation that behaves like a raster based paint operation yet has the benefits of a vector based paint operation. One or more embodiments of the invention provide such capabilities.

When performing a raster based paint operation, the program 208 records vector information representative of the raster operation in the background. Thus, unlike true vector operations that records the operations based on a selected tool in real time, the present invention records the vector representation (in real time or with a delay) in the background without affecting the operation performed by the user. Such vector information is recorded in the background in an invisible buffer.

The vector information that is recorded comprises one or more paths that reflect the paint operation. For example, three splines may be created based on the raster brush action: (1) path; (2) speed/rate; and (3) pressure.

The path of the raster brush stroke consists of a series of representative points that identify the path taken by the user. The points can be used to generate a Bezier curve that reflects the full path of the stroke. The number of points may vary depending on the level of accuracy desired. For example, a user may have the option of storing fewer points which would less accurately reflect the raster brush stroke. Alternatively, the user may elect to have many points that would more accurately reflect the brush stroke. In yet another embodiment, the number of points to be stored and the level of accuracy are automatically determined without user input. While various methods for storing the path and the level of accuracy of the path are described herein, the invention is intended to cover alternative methods.

The speed/rate spline indicates the speed at which the raster brush stroke was applied to the canvas (e.g., drawn by the user). A high rate will produce a smooth continuous stroke, and a low value would produce a less continuous stroke with larger gaps between brush images. Such speed/rate based information may be used in conjunction with the path spline to determine the number of points to be recorded as part of the speed/rate spline. The speed information may change at different points of the brush stroke, and the invention may record the speed at the different locations. Alternatively, the average speed used when creating the brush stroke may be stored. Similar to the path spline, if more details relating to the rate/speed information are stored, a more accurate reflection of the speed of the actual brush stroke is obtained. In this regard, the user may be provided with the option of recording the speed at certain intervals based on time or pixel distance (e.g., every 10 mS—how many pixels have been painted in 10mS or once 10 pixels have been painted, determining the length of time taken to draft the pixels). However, the speed may also be based on the path spline or number of points reflected in the path spline such that the speed from each point in the path to the next point in the path may be recorded. While some of the methods for determining the speed of the brush stroke are described above, the invention is intended to encompass alternative methods.

The pressure spline determines the pressure applied by the user during the paint operation. Users often utilize a stylus 206B and tablet to conduct a paint operation. Alternatively, various keys/buttons could be used in combination with a cursor control device 206A to determine the pressure. For example, the user may press and hold the right mouse button to apply paint at 80% pressure, the middle button to paint at 40% pressure, or the left button to paint at 20% pressure. The amount of pressure may affect the thickness of the paint stroke, the color of the paint stroke, the transparency of the paint applied to the image, or other paint stroke attributes. To accurately store and utilize the vector based information for a raster stroke, the invention records the amount of pressure utilized during the stroke. Similar to the path and speed splines, the pressure spline may be more or less accurate depending on how frequent the pressure measurements are obtained. Further, the frequency may be determined by the user or automatically determined by the program 208. While various methods may be used for determining the pressure or the frequency of a measurement, the invention is intended to encompass any such methodology.

Figure 4:
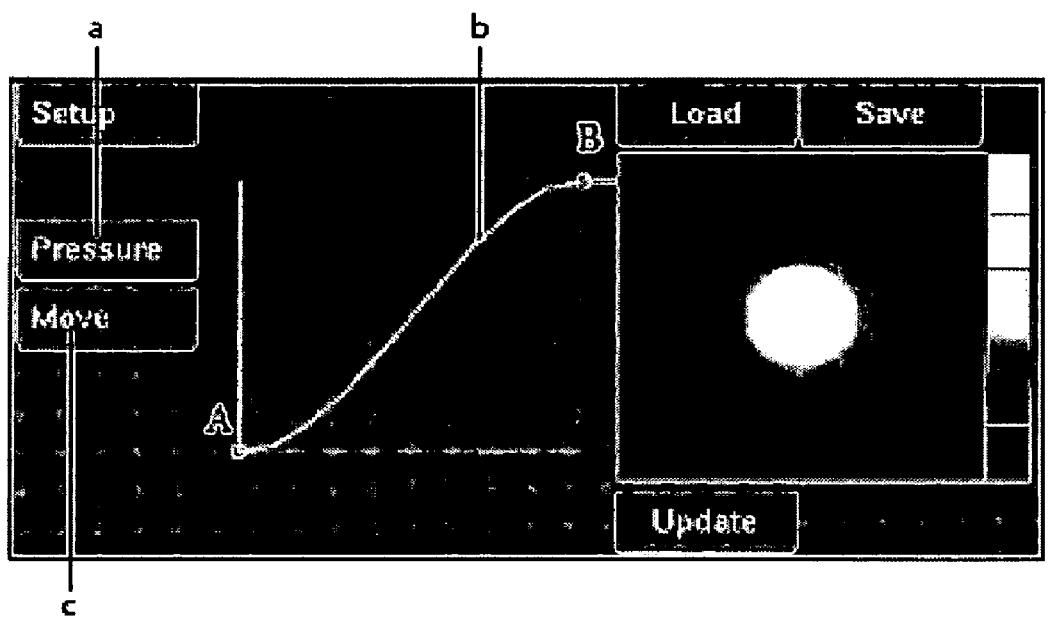
FIG. 4 illustrates a pressure profile in accordance with one or more embodiments of the invention.

To utilize the pressure spline that represents that amount of pressure taken throughout an actual stroke, the application may utilize a pressure profile. A pressure profile specifies how quickly paint is applied depending on the pressure applied to a tablet. FIG. 4 illustrates a pressure profile in accordance with one or more embodiments of the invention. The Pressure button allows the user to alternate between modifying the brush shape properties or the pressure profile. When in the Pressure profile mode, the slope of curve b indicates how quickly paint is applied as the user presses on the tablet. If the curve is steep, a small amount of pressure applies full paint to the canvas. If the curve is soft and rounded, the user must press harder and longer to apply full paint. By selecting the move button c, the user can alter point A or B on the curve to adjust the curve.

In addition to the path, speed, and pressure splines, additional brush stroke related information may be recorded. For example, the color, style, brush type, brush size, brush opacity, brush roll (e.g., used to roll the brush around the x-axis), brush jitter (e.g., used to randomize the brush strokes applied to the image—a high value produces a greater dispersion of paint while a low value produces a greater concentration), brush direction (e.g., used to rotate a brush around the z-axis and thereby cause a calligraphy effect), layer. Such information may be recorded more or less frequently similar to that of the path, speed, and pressure spline measurements.

While the above-identified information may be stored for a given brush stroke, the entire raster image of each stroke may not be recorded. Accordingly, a significantly less amount of information is stored by program 208 compared to that of a raster based paint operation. In addition, while the information is stored, the actual stroke or an actual conversion of the raster stroke from the vector information is not conducted until needed. Thus, while the vector information is stored, the vector information is not used until needed thereby conserving processing and time.

The stored information may only be used if a raster paint operation is invalid or if the user elects to conduct an operation that utilizes the information. In this regard, some systems may record the full raster brush stroke for several strokes but discard information after two or three strokes due to the memory and processor requirements that would be needed. Accordingly, if the user attempts to perform an undo operation beyond two or three strokes/levels/operations, the raster-based undo operation would be invalid. The system would then utilize the stored information.

The stored information provides the ability to perform a variety of actions that were not previously available in a raster based stroke operation. For example, a stroke could be recalculated, modified, or resized. In addition, the stored information would enable an unlimited number of undo operations and clip-less setups.

With respect to recalculating a stroke, the vector-based information that was stored is used to recalculate or approximate the raster based stroke. While the newly recreated raster based stroke approximates the originally drawn raster based stroke, it is not perfect because it is not a pure raster stroke but is created based on the vector information. However, the type and amount of vector based information used provides for a stroke that is more accurate than simply converting a pure vector-based stroke to a raster operation (i.e., since the pure vector-based operation is not a natural manner for conducting a stroke). The newly created stroke can then be used to perform an undo operation or for editing/modification purposes as described below.

For stroke modification operations, the approximate stroke is recreated as described above and the user can then modify the various attributes of the stroke as desired. For example, the path, speed/rate, or pressure of one or more points in the raster stroke can be modified. Alternatively, the color, size, jitter, etc. of the paint stroke can be changed.

In view of the above, various capabilities are available based on the vector-based information stored for the raster based paint stroke. For example, with the ability to recreate the stroke, an unlimited number of undo levels may be available. The system merely needs to recalculate the strokes and apply them to the canvas.

Another capability is that of clip-less setups. A setup is a file that contains a record of all changes made to a clip in a particular module (note that a clip is a series/sequence of frames). Setups allow the user to save work separately from a clip so that the work may be loaded and worked on at any time or applied to other clips. In the prior art, raster paint strokes were drawn on a frame of a clip. Further, the stroke needed to be stored on every frame in the clip. Thus, in the prior art, a setup file containing the record of changes (i.e., a paint stroke) requires a reference to the frameID in a framestore and a complete copy of the raster stroke for each frame. By utilizing the vector based information, only the metadata or vector information needs to be stored and the entire stroke need not be stored with each frame.

Figure 1:
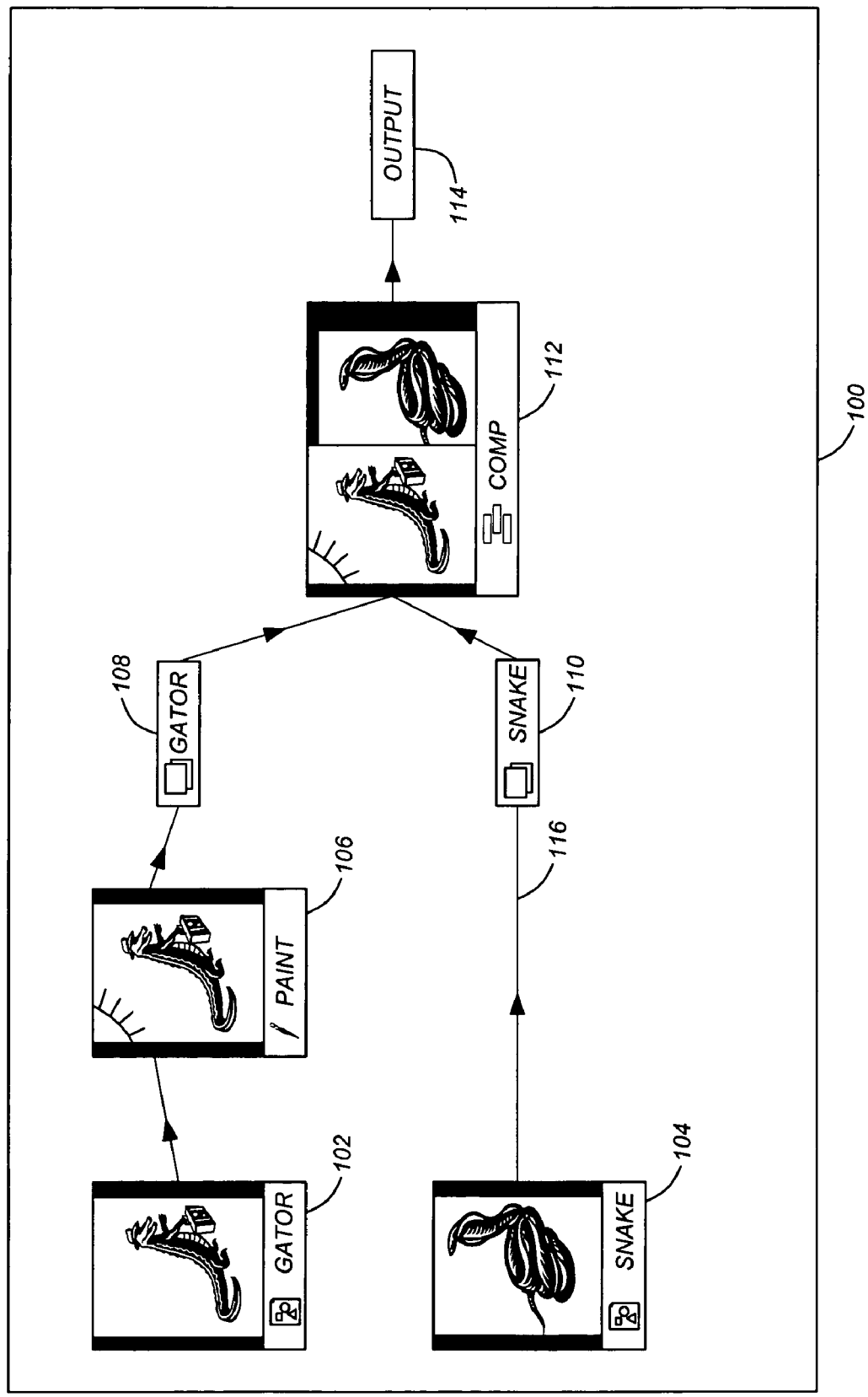
FIG. 1 illustrates a process tree in a schematic view in accordance with one or more embodiments of the invention.

In addition, as described above, in Batch Paint, various nodes may be utilized to conduct a paint operation (e.g., see FIG. 1). With a pure raster based paint operation, when the operation is conducted in a particular node, the source content is altered by the raster content. Further, if another operation (e.g., a compositing operation or other operation) is performed in a subsequent node, the content is again altered. Accordingly, the raster based stroke cannot be changed and reapplied. Thus, even if desired, the user cannot change the raster based stroke after subsequent nodes have executed. However, by utilizing the vector-based information as described above, changes to the brush stroke made in paint can be made after further nodes have executed. Further, the change made in an earlier brush stroke can be propagated through past subsequent nodes without affecting the performance of the other nodes. To perform such an operation, when the raster-based stroke is created in a particular node, the vector-based information is stored. Thereafter, the vector-information can be used to regenerate the raster stroke and allow modifications to the stroke as described above.

Logical Flow

Figure 5:
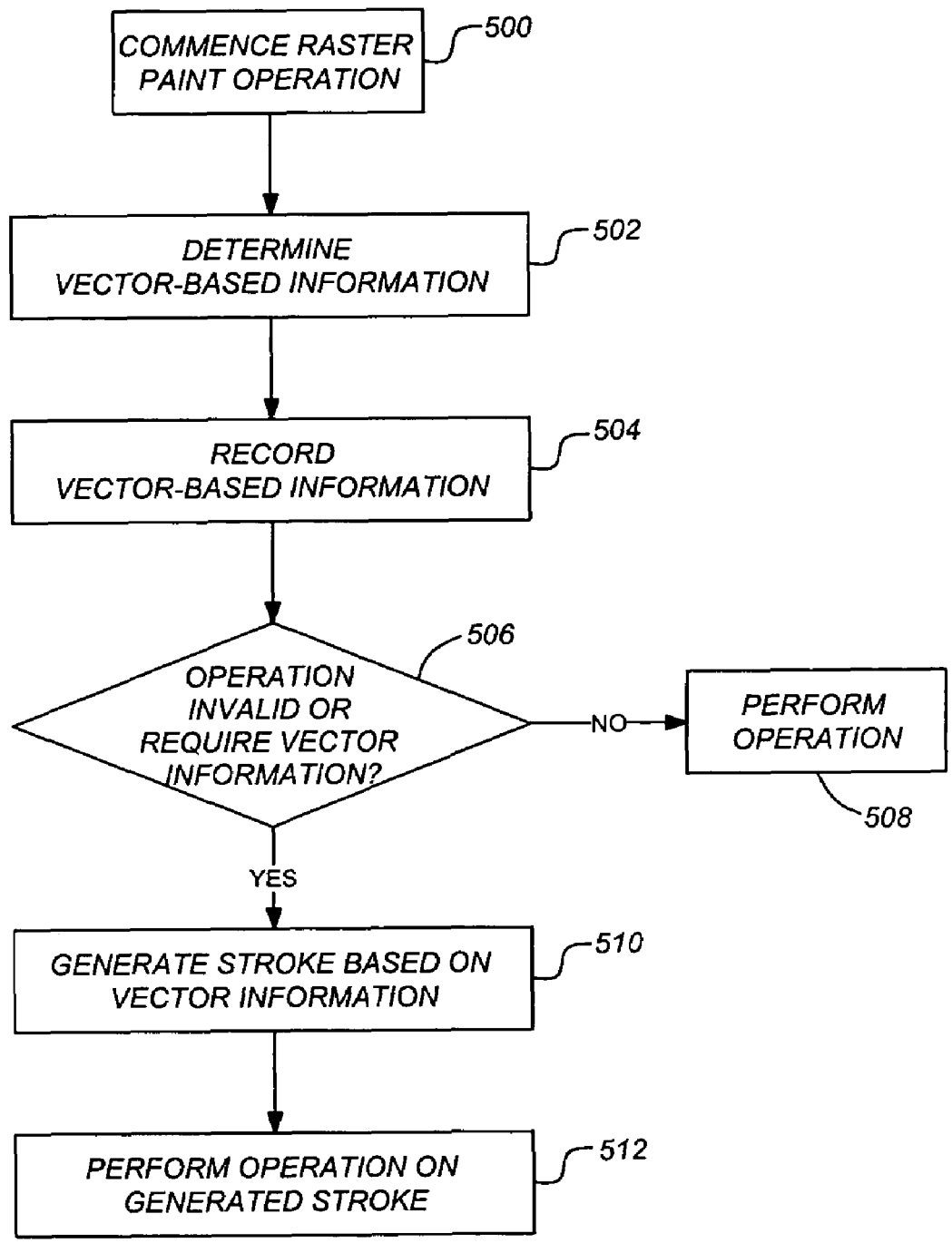
FIG. 5 is a flow chart illustrating the logical flow for conducting a hybrid raster/vector based paint operation in accordance with one or more embodiments of the invention.

FIG. 5 is a flow chart illustrating the logical flow for conducting a hybrid raster/vector based paint operation in accordance with one or more embodiments of the invention. At step 500, the user commences a raster-based paint operation (e.g., conducts a paint stroke).

At step 502, the vector-based information that represents the brush stroke is determined/captured (in the background). As described above, the vector-based information may comprise various splines such as a path spline, speed/rate spline, and/or pressure spline. The various splines/information may be extracted from the brush stroke based on parameters either specified by the user or default parameters of the program 208. Thus, depending on the parameters, the vector based information may closely reflect the raster stroke operation or may only roughly reflect the operation. At step 504, the vector-based information is recorded/stored in memory (e.g., in an invisible buffer in memory 310 or cache 308) or permanently stored (e.g., on hard disk drive 312, or other portable disk such as a DVD or ZIP disk). Such information may also be stored remotely in a network/server based architecture.

At step 506, the program 208 determines if a user operation is invalid or utilizes/requires the vector based information. For example, as described above, if the user attempts to perform multiple undo operations, the stored raster information may not be sufficient support the operation. Alternatively, the user may elect to perform an operation that requires the use of the vector-based information (e.g., a stroke recalculation, a stroke modification, a stroke resizing, or a clip-less setup).

If the user elects to perform a valid operation or an operation that does not utilize/require the vector based information, the operation is simply performed at step 508. Alternatively, if an invalid operation or an operation that utilizes/requires the vector-based information is attempted, the process continues at step 510. At step 510, the raster based stroke represented by the vector-based information is recreated/generated. Thereafter, the operation is performed on or uses the generated stroke at step 512. For example, once the stroke has been regenerated at step 510, the user can elect to modify the stroke (e.g., change the brush type or modify the path), resize the stroke, perform an unlimited number of undo operations (e.g., without storing the entire raster image), etc. Accordingly, the vector-based information enables numerous operations to be conducted that are not possible with a pure raster based paint operation.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for conducting a paint operation comprising:
    (a) commencing a first raster-based paint operation;
    (b) determining vector-based information based on input from a user conducting the first raster based paint operation in a paint application;
    (c) recording the vector-based information representative of the first raster based paint operation;
    (d) determining if a requested user operation requires the vector-based information; and
    (e) if the requested user operation requires the vector-based information:

(i) generating a representative raster based stroke based on the vector-based information; and
(ii) performing the requested user operation on the representative raster based stroke.

2. The method of claim 1 wherein the paint operation comprises a paint stroke.

3. The method of claim 1 wherein the vector-based information comprises a path spline.

4. The method of claim 1 wherein the vector-based information comprises a speed/rate spline.

5. The method of claim 1 wherein the vector-based information comprises a pressure spline.

6. The method of claim 1 wherein the requested user operation comprises a stroke recalculation.

7. The method of claim 1 wherein the requested user operation comprises a stroke modification.

8. The method of claim 1 wherein the requested user operation comprises a stroke resizing.

9. The method of claim 1 wherein the requested user operation comprises a clipless setup.

10. The method of claim 1 wherein the requested user operation comprises an undo operation.

11. The method of claim 1 wherein the recording is conducted in a background on a layer invisible to the user.

12. The method of claim 1 wherein the vector-based paint operation survives changes in nodes upstream of a paint node in which the vector-based paint operation is conducted in a schematic system.

13. A computer implemented system for conducting a paint operation comprising:
(a) a computer having a memory;
(b) a paint application executing on the computer, wherein the paint application is configured to:
(i) commence a first raster-based paint operation;
(ii) determine vector-based information based on input from a user conducting the first raster based paint operation;
(iii) record the vector-based information representative of the raster based paint operation;
(iv) determine if a requested user operation requires the vector-based information; and
(v) if the requested user operation requires the vector-based information:
(1) generate a representative raster based stroke based on the vector-based information; and
(2) perform the requested user operation on the representative raster based stroke.

14. The system of claim 13 wherein the paint operation comprises a paint stroke.

15. The system of claim 13 wherein the vector-based information comprises a path spline.

16. The system of claim 13 wherein the vector-based information comprises a speed/rate spline.

17. The system of claim 13 wherein the vector-based information comprises a pressure spline.

18. The system of claim 13 wherein the requested user operation comprises a stroke recalculation.

19. The system of claim 13 wherein the requested user operation comprises a stroke modification.

20. The system of claim 13 wherein the requested user operation comprises a stroke resizing.

21. The system of claim 13 wherein the requested user operation comprises a clipless setup.

22. The system of claim 13 wherein the requested user operation comprises an undo operation.

23. The system of claim 13 wherein the vector based information is recorded in a background on a layer invisible to the user.

24. The system of claim 13 wherein the vector-based paint operation survives changes in nodes upstream of a paint node in which the vector-based paint operation is conducted in a schematic system.

25. A program storage device, readable by a computer, tangibly embodying at least one program of instructions executable by the computer to perform method steps of conducting a paint operation, the method steps comprising the steps of:
(a) commencing a first raster-based paint operation;
(b) determining vector-based information based on input from a user conducting the first raster based paint operation;
(c) recording the vector-based information representative of the raster based paint operation;
(d) determining if a requested user operation requires the vector-based information; and
(e) if the requested user operation requires the vector-based information:
(i) generating a representative raster based stroke based on the vector-based information; and
(ii) performing the requested user operation on the representative raster based stroke.

26. The program storage device of claim 25 wherein the paint operation comprises a paint stroke.

27. The program storage device of claim 25 wherein the vector-based information comprises a path spline.

28. The program storage device of claim 25 wherein the vector-based information comprises a speed/rate spline.

29. The program storage device of claim 25 wherein the vector-based information comprises a pressure spline.

30. The program storage device of claim 25 wherein the requested user operation comprises a stroke recalculation.

31. The program storage device of claim 25 wherein the requested user operation comprises a stroke modification.

32. The program storage device of claim 25 wherein the requested user operation comprises a stroke resizing.

33. The program storage device of claim 25 wherein the requested user operation comprises a clipless setup.

34. The program storage device of claim 25 wherein the requested user operation comprises an undo operation.

35. The program storage device of claim 25 wherein the vector based information is recorded in a background on a layer invisible to the user.

36. The program storage device of claim 25 wherein the vector-based paint operation survives changes in nodes upstream of a paint node in which the vector-based paint operation is conducted in a schematic system.

* * * * *